W. A. DOBSON.
STEERING APPARATUS FOR SHIPS.
APPLICATION FILED MAY 12, 1916.

1,205,169.

Patented Nov. 21, 1916.
6 SHEETS—SHEET 1.

Fig. 1.

WITNESSES

INVENTOR
William A. Dobson.
BY Niedersheim
ATTORNEYS

W. A. DOBSON.
STEERING APPARATUS FOR SHIPS.
APPLICATION FILED MAY 12, 1916.

1,205,169.

Patented Nov. 21, 1916.
6 SHEETS—SHEET 6.

WITNESSES

INVENTOR
William A. Dobson
BY
ATTORNEYS

UNITED STATES PATENT OFFICE.

WILLIAM A. DOBSON, OF PHILADELPHIA, PENNSYLVANIA.

STEERING APPARATUS FOR SHIPS.

1,205,169.  Specification of Letters Patent.  Patented Nov. 21, 1916.

Application filed May 12, 1916. Serial No. 97,016.

*To all whom it may concern:*

Be it known that I, WILLIAM A. DOBSON, a citizen of the United States, residing in the city and county of Philadelphia, State of Pennsylvania, have invented a new and useful Steering Apparatus for Ships, of which the following is a specification.

My invention relates to the general class of steering gears in which springs are so employed as to absorb the shock due to the impact of the sea striking the rudder and relieve it of undue stresses.

My invention further relates to that class of steering gears which, in the art of ship building, are known as the right and left-hand screw type; and it is an improvement upon what is known as the Wilson-Pierre gear, in which a floating quadrant the rim or face of which is toothed or fitted with a toothed rack, is engaged by a pinion driven by the steering engine,—the quadrant being loose on the rudder stock and transmitting power from the engine through the interposition of two springs which connect the two arms of the quadrant with a tiller fixed upon the rudder stock.

In the Wilson-Pierre construction, when the rudder is struck by a sea and the shock is not wholly absorbed at the springs, the stresses are transmitted to the pinion which meshes with the rack of the quadrant, with the result that the pinion is likely to be broken by the undue stress which falls upon it,—a disadvantage which it is one of the objects of my invention to overcome.

My invention has for its principal object a construction of steering gear which utilizes the well-known right-and-left hand driving screw, and in which shock-absorbing springs are so interposed between, and combined with, both a cross-head fixed upon the rudder stock and a floating cross-head connected with the fixed cross-head by the springs, that the springs absorb the shock upon the rudder and do not transmit it to the connective screw-and-nut transmission mechanism through the intervention of which the operation of the steam steering engine, electric motor, or hand wheel, is transmitted to the floating cross-head.

With the foregoing object in view, my invention primarily comprehends a steering apparatus of the general type hereinafter described and typified in an operative embodiment illustrated in the accompanying drawing.

My invention further comprehends such details of construction as make my apparatus as an entirety a dependable mechanism for occasioning the steering of the ship.

For the purpose of illustrating my invention I have shown in the accompanying drawings both a generic and a specific type and embodiment of it which are at present preferred by me because in practice they give satisfactory and reliable results. It is to be understood, however, that the various instrumentalities in which my invention is shown as embodied can be variously arranged and organized and that my invention is not therefore limited to the precise arrangement and organization of these instrumentalities as typified in the construction depicted in the drawings and hereinafter described.

In the drawings.

Similar numerals of reference indicate corresponding parts.

Referring to the drawings,—the numeral 1, wherever applied, indicates some component element or member of a hull of a ship.

Figures 5, 6:
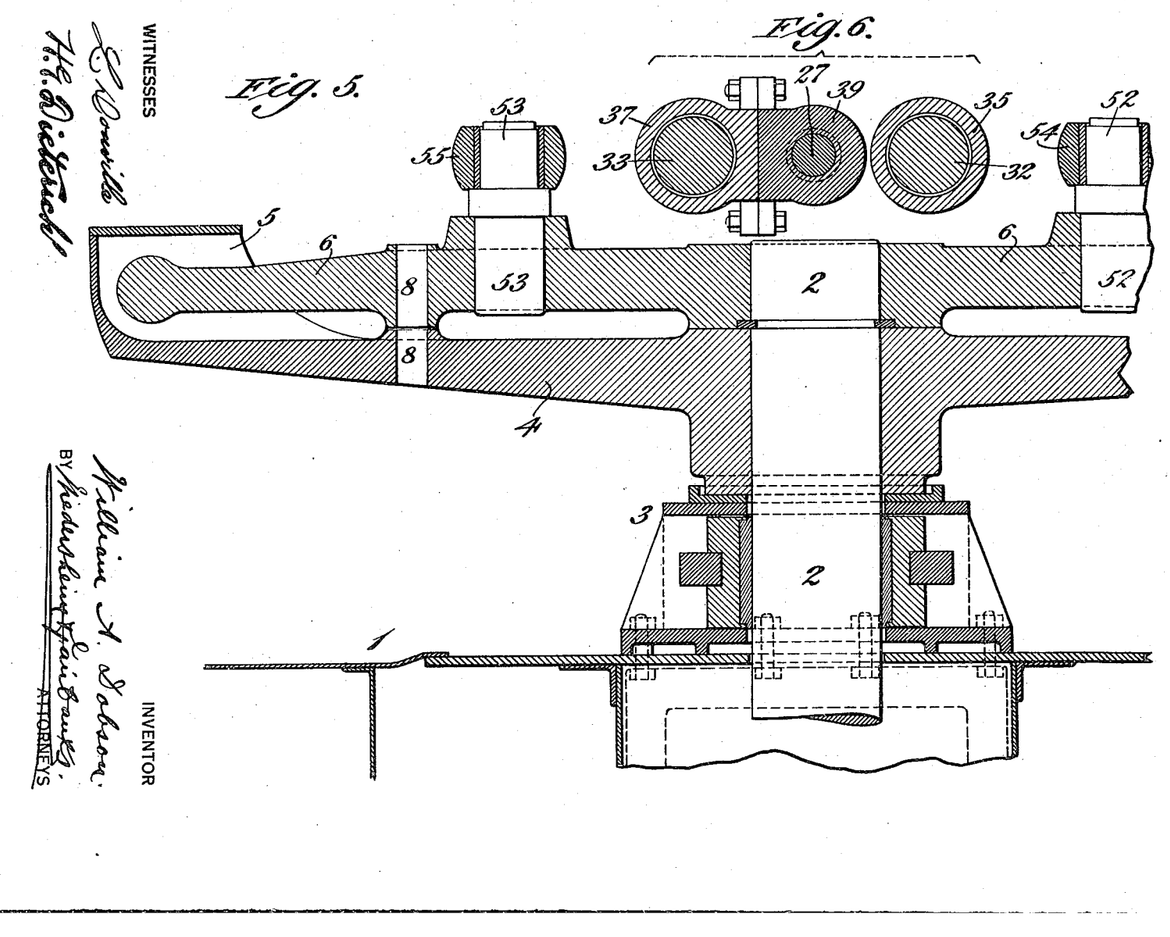
Fig. 5 represents in transverse, vertical, enlarged sectional elevation,—taken on the dotted line 5—5 of Fig. 1, and sighting in the direction of the arrows,—so much of the rudder stock, the fixed cross-head, and the floating cross-head, as are necessary for illustration.
Fig. 6 represents in transverse, vertical, enlarged sectional elevation,—taken on the line 6—6 of Fig. 1, and sighting in the direction of the arrows,—a portion of the driving screw shaft, the side rods, and the driven nuts.

2 designates a rudder stock of any preferred construction and mounted in any usual manner, such, for instance, as is indicated in the detail of a rudder bearing 3, an outline of a working drawing of which is represented in Fig. 5, and need not be further referred to.

4 is a tiller, hereinafter designated as the fixed cross-head, keyed to the rudder stock.

At or near each of its outer ends the fixed cross-head is provided with a box or casing 5 for the shock absorber through the intervention of which a yielding connection is afforded between, preferably, the outer, ends, of the fixed cross-head 4 and the floating cross-head 6, which latter is centrally mounted upon but not keyed to the rudder stock.

Figure 1:
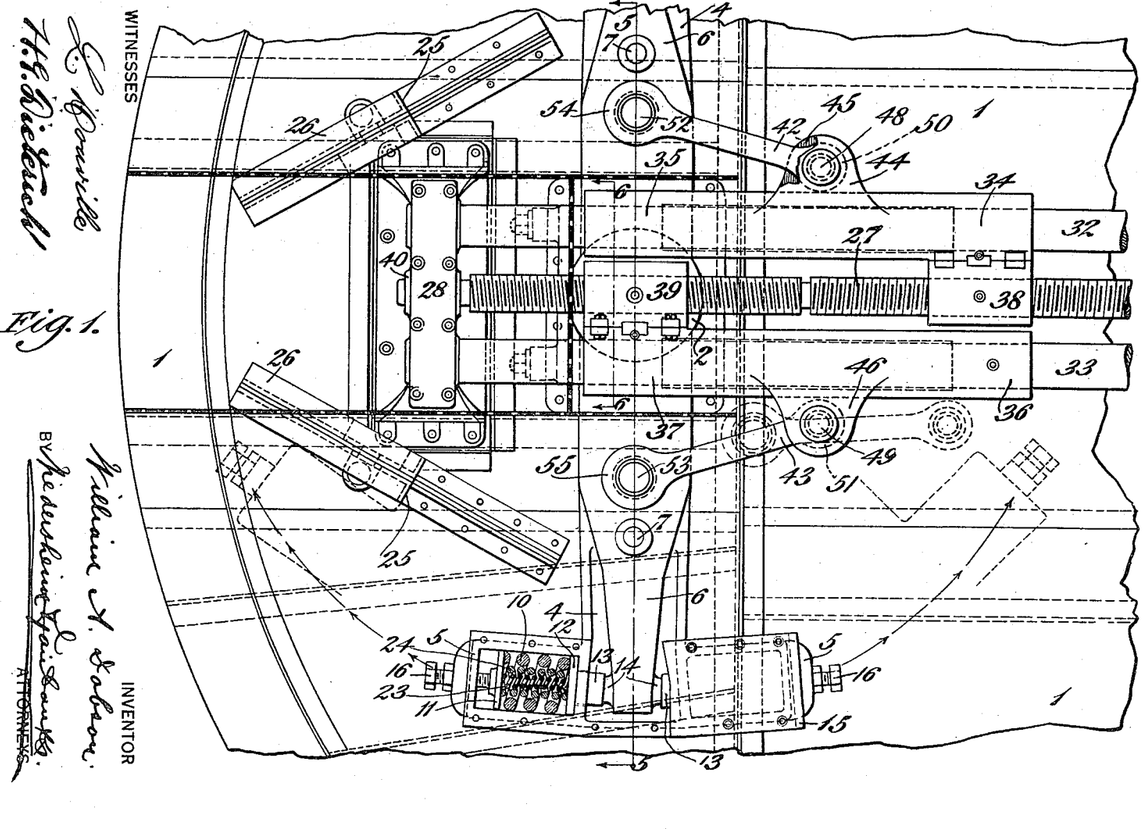
Figure 1 represents in plan the aft portion of a typical embodiment of my invention.
Figure 3:
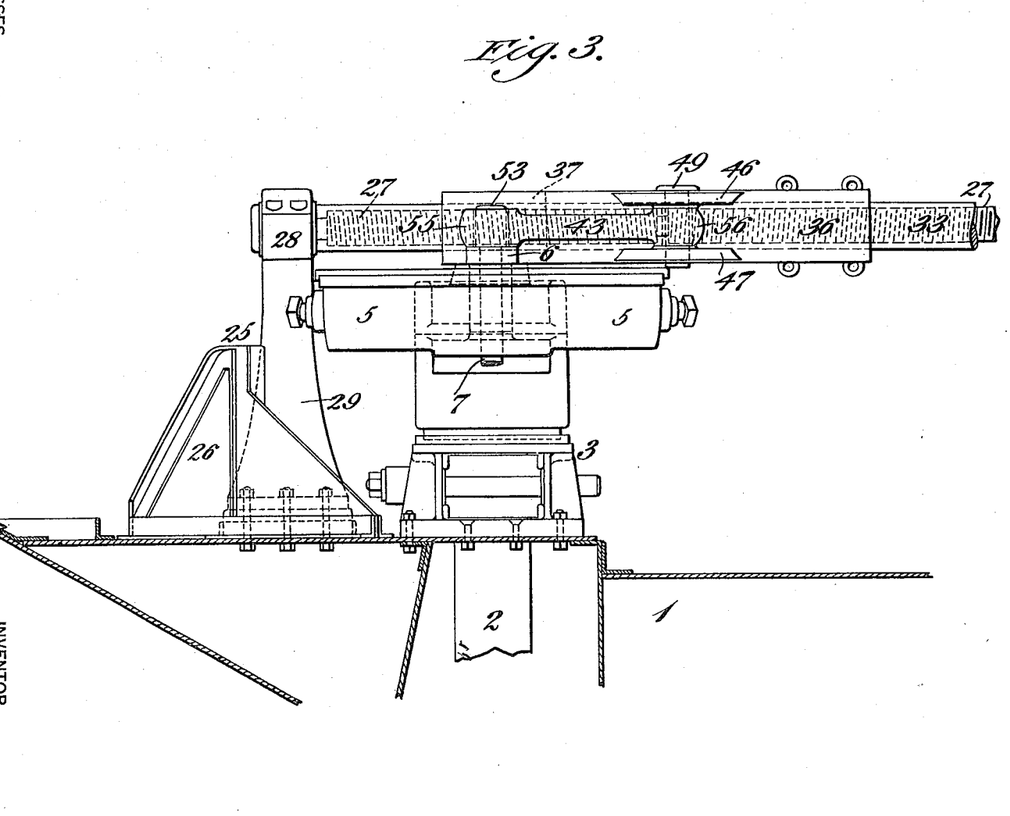
Fig. 3 represents in side elevation so much of my apparatus as is illustrated in plan in Fig. 1.

Except for the connection by the shock absorbers hereinafter described, there is no positive connection between the floating cross-head and the fixed cross-head,—although in case of emergency safety pins 7, Figs. 1 and 3, are adapted to be dropped into vertical apertures 8 in both the floating cross-head and the fixed cross-head, which when the two cross-heads are in parallel longitudinal disposition, are alined. The shock absorbers are applied, as stated, to connect the two cross-heads, so that the tendency to rotary movement imparted to the fixed cross-head from the rudder through the rudder stock when the impact of the sea against the rudder occasions it, will be imparted to the floating cross-head and be taken up by the shock absorbers.

The precise organization of the shock absorbers and the means for applying them to the two cross-heads so as to connect them preferably, to increase the leverage, at or near their outer ends, may be varied; and in the construction shown in Figs. 1, 3 and 5, I have employed a double, and preferably counterpart, set of shock absorbing springs,—while in the constructions of Figs. 7 to 10 inclusive, I have shown a single set of springs.

It is immaterial to the result to be obtained whether the springs be a single set or a double set, or whether in either instance the set be composed of a single spring, or, as is preferable for compactness of application, of a plurality of assembled springs. The point is that I directly connect the fixed and floating cross-heads by springs so applied exteriorly to the common axis of the heads, which is that of the rudder stock, as to cause the springs to take up the shock of the sea upon the rudder, which is transmitted through the rudder stock and the fixed cross-head, before it is transmitted to the floating cross-head, and thereafter through it transmitted to the connective screw-and-nut gearing which I employ to transmit the motive power which the steering wheels control.

Referring now to Figs. 1, 3 and 5, the outer ends of the fixed cross-head 4 are formed or provided with casings or twin boxes designated 5,—both preferably counterparts and oppositely disposed in segmental relation to the axis of the rudder stock, and facing each other. 10, 24 and 23, are springs the opposite ends of which are contained within the hollow interiors of the boxes, extending longitudinally thereof and confined between setting-up plates 11 at the outer ends of the boxes, and abutment plates 12 at the inner ends of the boxes, which latter are preferably formed with plunger heads 13 extending through the inner ends of the two boxes and bearing against bosses 14 on opposite sides of the outer end of the floating cross-head. The construction of the boxes is not material, but in making them it is well to use cover plates 15 and to make the setting-up plates adjustable to control the tension of the springs by means of set screws 16. It will be apparent that the fluctuation or rotary movement of the fixed cross-heaad in either direction will be cushioned by the springs before it is imparted to and taken up by the floating cross-head.

Figures 7, 8:
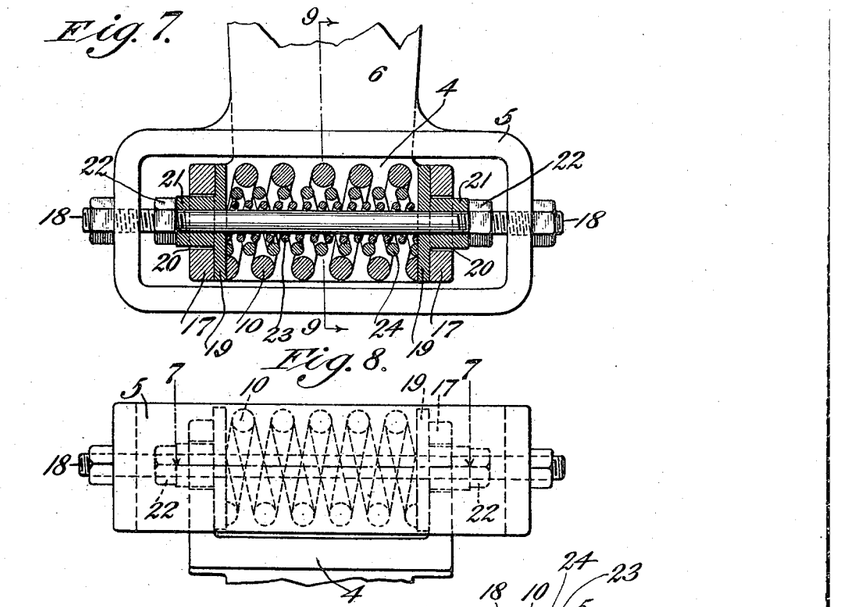
Fig. 7 represents in plan, partly sectional on the line 7—7 of Fig. 8, a modified construction of shock absorber.
Fig. 8 represents in side elevation looking from the outside, the shock absorber of Fig. 7.
Figures 9, 10:
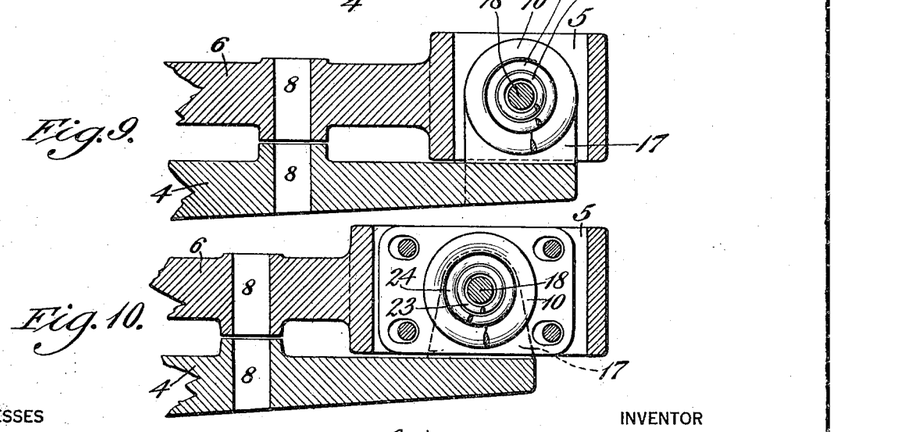
Fig. 9 represents in transverse section on the dotted line 9—9 of Fig. 7, the shock absorbers of Figs. 7 and 8.
Fig. 10 represents in a view similar to Fig. 9 the application of four, instead of one stay rod for supporting and steadying the elements of the shock absorber.

Referring now to Figs. 7, 8 and 9, the box 5 of these figures is a single box, only one of which is formed or mounted upon each outer end of the floating cross-head, transversely of the ends of which each extends, and not upon the fixed cross-head;—and that in this construction the shock-adjusting springs are carried between spring heads 17 or abutments, pairs of which are connected with the respective ends of the fixed cross-head and rise therefrom so as to enter within the boxes as clearly illustrated. The spring 10 in this application encircles the tie rod 18 bolted to and between the ends of the box,— and as a convenient means of confining the springs between the spring heads 17, I apply to the tie rod at each of its ends but within the spring heads or abutments, setting-up plates 19 which extend through apertures 20 in the spring heads by being formed with sleeve-like extensions 21 against which nuts 22 bear.

In the construction both of Figs. 1, 3 and 5, and of Figs. 7, 8 and 9, I have indicated a plurality of springs, that is to say, within the large outer springs 10 are inclosed in internal, concentric or nested axial relationship, two other groups of springs of smaller wire diameters and smaller external diameter, considered as groups, in which the innermost is designated 23, and the intermediate or middle 24. As already explained one set of springs will serve to absorb the shock, and when, for any such reason as compactness or intensity, a plurality is employed, it may be a plurality of two, three, or more sets.

Referring now to Figs. 1 and 3, the throw of the cross-heads under the actuation of their screw-and-nut connections is in both directions preferably controlled by a rudder stop 25 of which there are two, one upon each side of the longitudinal axis of the gear shaft. These rudder stops may be of any preferred form or construction, and be either a part of or supported by stop brackets 26 erected from a deck or other component of the hull, and against one or the other of them the floating cross-head when fully thrown, makes contact. The relative position of the box of the shock absorber when contact has been made with the stop is indicated in dotted lines in Fig. 1. The means by which the rotary movement of the rudder stock about its axis and the consequent throw of the cross-head are effected, are, in the organization of my steering apparatus as a whole, accomplished by a right-and-left-hand driving screw shaft 27, geared to a steering engine or motor which is connected up with steering wheels in any usual or desired manner.

The construction of the connective or transmission means which I prefer to resort to, is as follows:—28 is an aft bearing supported upon a bracket 29 from the deck, and 30 a forward bearing similarly supported upon a bracket 31 erected either from the deck or other member of the hull framework. Extending fore and aft between the bearings 28 and 30 are a pair of fixed parallel side rods 32, 33, upon which the guide sleeves 34 and 35, and 36 and 37, respectively, travel under the actuation of the driving nut 38 connected with the guide sleeve 34, 35, and the driving nut 39 connected with the guide sleeve 36 and 37. The nut 38 traverses the forward threaded portion of the driving screw shaft and the nut 39 traverses the aft threaded portion of said driving screw shaft. The screw shaft itself is rotatable in boxings 40 and 41, respectively, on the aft bearing 28 and the forward bearing 30,—and the rotation of the screw shaft in either direction is occasioned by any preferred gearing, a type of which I have illustrated and hereinafter described. The side rods 32 and 33 are, as explained, fixed between the aft bearing 28 and the forward bearing 30, and are of such length that, as will be apparent from a consideration of the drawing, they serve to steady the driving nuts which are respectively connected with them. The driving nuts 38 and 39 are also themselves of sufficient length to encompass and take up several threads of the driving screw shaft 27, so that the strength of the transmission is not limited to a single contact, as in the case of the Wilson-Pierre gear already referred to. 42 and 43 are link connections being what I term side links, respectively connected, 42 with the guide sleeve 34 and 35, and 43 with the guide sleeve 36 and 37; and connection of the side links with the guide sleeves is conveniently effected by a pair of lugs 44 and 45 on the guide sleeve 36 and 37, and a corresponding pair of lugs 46 and 47 on the guide sleeve 34 and 35,—between which pairs of lugs are respectively introduced the pivot pins 48 and 49 which pass through the drilled ends 50 and 51 of the forward ends of the side links 42 and 43. The side links are respectively connected upon opposite sides of its central axis, with the floating cross-head, by pivot pins 52 and 53 connected with and springing vertically upwardly from said floating cross-head, over which pins the drilled and bossed ends 54 and 55 of the side links fit. The connection of the side links with the guide sleeves and the floating cross-head described, is purely a mechanical one and sufficiently illustrated in Figs. 1, 3 and 5 of the drawings to require no further explanation. Obviously, in the rotation of the right-and-left handed driving screw shaft the right-and-left handed driving nuts will be respectively caused to approach or to separate from each other, and, in so doing, will occasion a corresponding approach or separation of the guide sleeves and the side links, and consequently through the side links the "swing" or rotative movement of the floating cross-head about its axis to the extent of the movement imparted to it.

Figure 2:
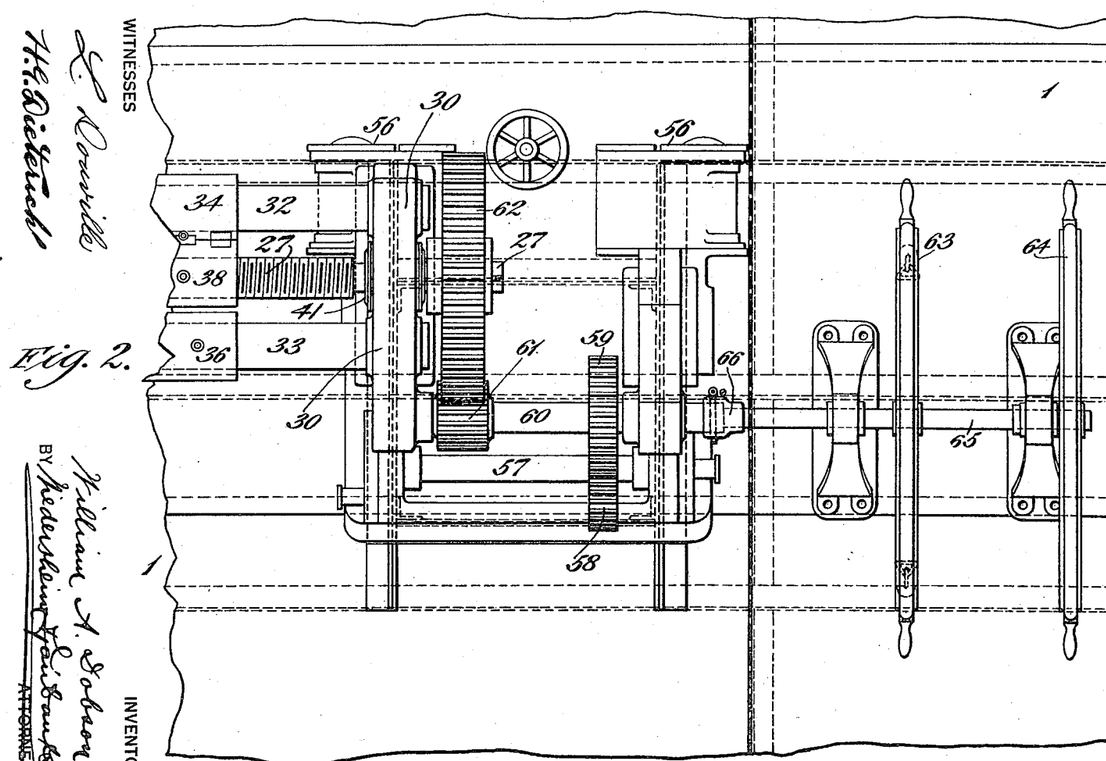
Fig. 2 represents, also in plan, a forward continuation of the construction shown in Fig. 1, the two views when taken together illustrating in plan the apparatus as an entirety.
Figure 4:
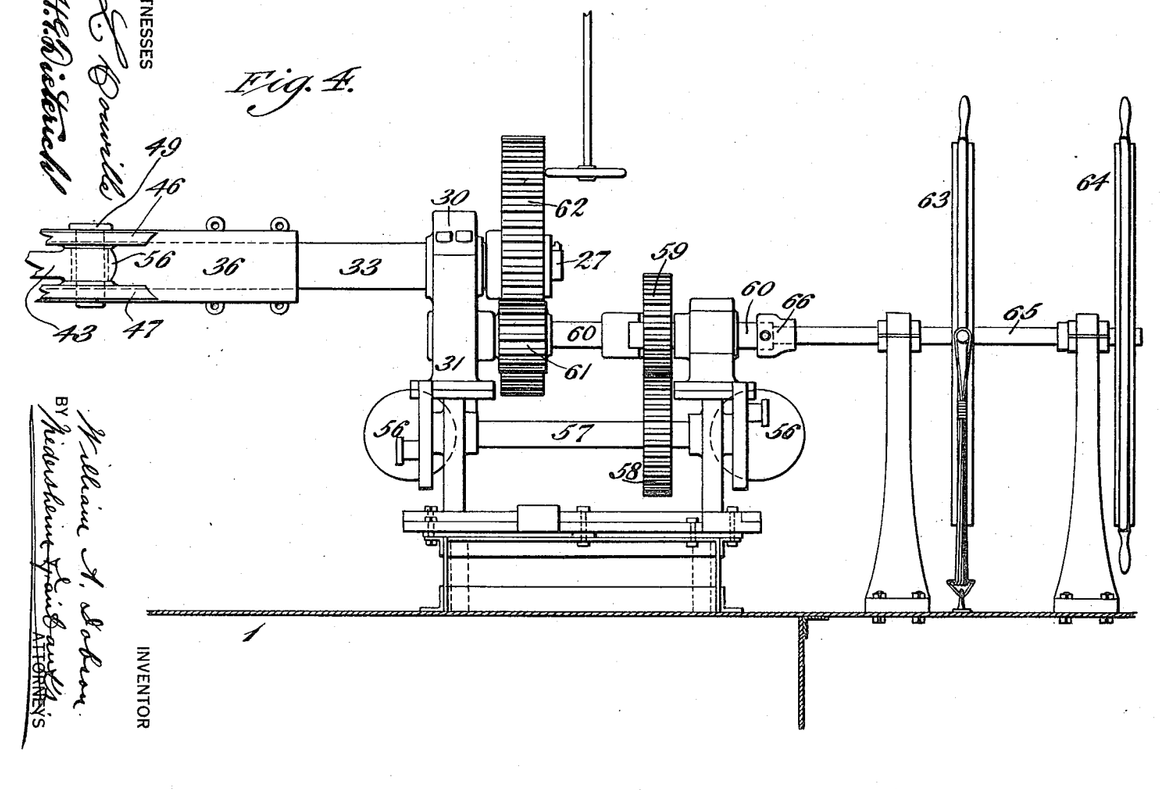
Fig. 4 represents in side elevation so much of my apparatus as is illustrated in plan in Fig. 2.

Inasmuch as, in order merely to illustrate an operative steering gear as an entirety, I have shown a typical means for operating the driving screw shaft,—I may explain with reference to Figs. 2 and 4 of the drawings, that 56 typifies a two cylinder steering engine, the pistons, piston rods, and cranks of which (not numbered) drive a crank shaft 57 suitably housed and having geared to it a driving spur wheel 58, engaged with a driven spur wheel 59 on the countershaft 60, which spur wheel through a pinion 61 on the countershaft is engaged with a driven spur wheel 62 on the driving screw shaft 27. As a further connection in the event that the engine breaks down and control of the steering gear by hand wheels is necessary, I have illustrated a pair of the usual steering wheels 63—64, whose shaft 65 is connectible by a shifting clutch 66 of any preferred type with the countershaft 60.

The operation of my apparatus as an entirety so far as it has not already been sufficiently described, will be understood by any one familiar with the general types of steering gears of ships:—Thus, if it were not for the interposition of the shock-absorbing springs between the floating cross-head and the fixed cross-head, and the consequent yielding connection of these two cross-heads, the operation of the steering mechanism whether manual or mechanical, would simply be to actuate the floating cross-head without having any effect upon the rudder, and it is only through the shock-absorbing spring connection between the two cross-heads as already fully explained, that the effect of the steering apparatus as a whole is transmitted to the rudder.

The result of the operation of my construction of apparatus as a whole, is to relieve the stresses upon both the rudder stock and the driving screw shaft when the rudder is struck by a heavy sea, thereby preventing the breaking of the rudder stock and of the driving mechanism of the steering gear.

Having thus described my invention, what I claim as new and desire to secure by Letters Patent is:—

1. A steering apparatus for ships, which comprises in combination:—a hull,—a rudder,—a rudder-stock,—a cross-head fixed upon said rudder-stock,—a floating cross-head rotative upon said rudder stock,—shock-absorbing mechanism interposed between and connective of both cross-heads at their outer extremities,—and steering means for imparting rotative movement to the floating cross-head.

2. A steering apparatus for ships, which comprises in combination:—a hull,—a rudder,—a rudder-stock,—a cross-head fixed upon said rudder-stock,—a floating cross-head rotative upon said rudder stock,—shock-absorbing spring-mechanism interposed between and connective of both cross-heads at their outer extremities,—and steering means for imparting rotative movement to the floating cross-head.

3. A steering apparatus for ships, which comprises in combination:—a hull,—a rudder,—a rudder stock,—a cross-head fixed upon said rudder stock,—a floating cross-head rotative upon said rudder stock, shock absorbing mechanism interposed between and connective of both cross-heads at their outer extremities,—a right and left-handed screw connective transmission mechanism for imparting rotative movement to the floating cross-head,—and steering means for operating said transmission mechanism.

4. A steering apparatus for ships, which comprises in combination:—a hull,—a rudder,—a rudder-stock,—a cross-head fixed upon said rudder-stock,—a floating cross-head rotative upon said rudder stock,—shock-absorbing spring-mechanism interposed between and connective of both cross-heads at their outer extremities, a right and left-handed screw connective transmission mechanism for imparting rotative movement to the floating cross-head,—and steering means for operating said transmission mechanism.

5. A steering apparatus for ships, which comprises in combination:—a hull; a rudder;—a rudder stock;—a cross-head fixed upon said rudder stock;—a floating cross-head mounted upon the rudder stock;—shock-absorbing mechanism interposed between and connective of both cross-heads;—a transmission mechanism comprising a right-and-left-handed driving screw shaft, right-and-left-handed driving nuts upon said screw shaft, and link-connections between said nuts and the floating cross-head;—and steering means for operating said transmission mechanism.

6. A steering apparatus for ships, which comprises in combination:—a hull;—a rudder;—a rudder stock;—a cross-head fixed upon said rudder stock;—a floating cross-head rotative upon said rudder stock;—shock-absorbing mechanism interposed between and connective of both cross-heads;—a transmission mechanism comprising a right-and-left-handed driving screw shaft, right-and-left-handed driving nuts upon said screw shaft, and link-connections between said nuts and the floating cross-head;—and steering means for operating said transmission mechanism.

7. A steering apparatus for ships, which comprises in combination:—a hull;—a rudder;—a rudder stock;—a cross-head fixed upon said rudder stock;—a floating cross-head rotative upon the rudder stock;—shock-absorbing mechanism interposed between and connective of both cross-heads;—a transmission mechanism comprising a right-and-left-handed driving screw shaft, right-and-left-handed driving nuts provided with guide sleeves, upon said screw shaft, and link-connections between said guide sleeves and the floating cross-head;—and steering means for operating said driving screw shaft.

8. A steering apparatus for ships, which comprises in combination:—a hull;—a rudder;—a rudder stock;—a cross-head fixed upon said rudder-stock;—a floating cross-head rotative upon said rudder stock;—shock-absorbing mechanism interposed between and connective of both cross-heads;—a transmission mechanism comprising a right-and-left-handed driving screw shaft, right-and-left-handed driving nuts provided with guide sleeves, upon said screw shaft, and link-connections between said guide sleeves and the floating cross-head;—and steering means for operating said driving screw shaft.

9. A steering apparatus for ships comprising, in combination, a rudder-stock, a cross-head fixed upon said stock, a floating cross-head loosely mounted to swing about said stock, said cross-heads comprising radial arms one of which swings above the other, shock absorbing mechanism mounted upon the outer portion of one of the cross-heads and yieldingly engaging the other of said cross-heads, a right and left hand screw shaft, traveling nuts thereon which move to and from each other when said shaft is rotated and links extending from said nuts to points upon the floating cross-heads upon opposite sides of the rudder-stock, respectively, and between the shock absorbing mechanism and the rudder-stock.

10. In a steering mechanism, a rudder-stock, a fixed cross-head upon the rudder-stock, a floating cross-head, rotative upon the rudder-stock, a right and left hand screw shaft, nuts upon the right and left hand portions thereof, links pivotally connected with said nuts and with the floating cross-head upon opposite sides of the rudder-stock and shock absorbing mechanism interposed between the fixed and floating cross-head outwardly of the points of attachment of said links with the floating cross-head.

11. In a steering mechanism, a rudder-stock, a fixed cross-head upon the rudder-stock, a floating cross-head rotative upon the rudder-stock, a right and left hand screw shaft, nuts upon the right and left hand portions thereof, links pivotally connected with said nuts and with the floating cross-head upon opposite sides of the rudder-stock and shock absorbing mechanism interposed between the fixed and floating cross-head outwardly of the points of attachment of said links with the floating cross-head, said shock absorbing mechanism comprising yieldable members upstanding from the fixed cross-head and between which the floating cross-head moves.

In testimony whereof I have hereunto signed my name this eighth day of May, 1916.

WILLIAM A. DOBSON.

In the presence of—
J. BONSALL TAYLOR,
C. D. McVAY.

Copies of this patent may be obtained for five cents each, by addressing the "Commissioner of Patents, Washington, D. C."